(12) United States Patent
Hui et al.

(10) Patent No.: US 8,009,727 B2
(45) Date of Patent: Aug. 30, 2011

(54) EQUALIZER FOR SINGLE CARRIER FDMA RECEIVER

(75) Inventors: Dennis Hui, Cary, NC (US); Jung-Fu Cheng, Cary, NC (US); Håkan B. Björkegren, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1094 days.

(21) Appl. No.: 11/676,638

(22) Filed: Feb. 20, 2007

(65) Prior Publication Data

US 2008/0198911 A1 Aug. 21, 2008

(51) Int. Cl.
*H04B 1/10* (2006.01)
(52) U.S. Cl. .................... 375/230; 375/350
(58) Field of Classification Search .......... 375/229, 375/230, 232, 346–350
See application file for complete search history.

(56) References Cited

U.S. PATENT DOCUMENTS

| 6,868,276 B2 * | 3/2005 | Nissila ............. 455/504 |
| 2002/0161560 A1 * | 10/2002 | Abe et al. .......... 702/196 |
| 2005/0069023 A1 * | 3/2005 | Bottomley et al. .... 375/148 |
| 2006/0277298 A1 | 12/2006 | Kim et al. |

FOREIGN PATENT DOCUMENTS

| EP | 1705822 A2 | 9/2006 |
| WO | 03087978 A2 | 10/2003 |
| WO | 2005055636 A1 | 6/2005 |
| WO | 2007095966 A1 | 8/2007 |
| WO | 2008035935 A1 | 3/2008 |

OTHER PUBLICATIONS

H. Sari, G. Karam, I. Jeanclaude, "Transmission techniques for digital terrestrial TV broadcasting," *IEEE Communications Magazine*, vol. 33, Feb. 1995, pp. 100-109.
H. Sari, G. Karam, I. Jeanclaude, "Frequency-domain equalization of mobile radio and terrestrial broadcast channels," *Proc. Global Telecommunications Conference*, vol. 1, 1994, pp. 1-5.
D. Falconer, S.L. Ariyavistakul, A. Benyamin-Seeyar, B. Eidson, "Frequency Domain Equalization for Single-Carrier Broadband Wireless Systems," *IEEE Commun. Magazine*, Apr. 2002, pp. 58-66.
Farhoodi, A. A. et al. "ML Detection in MIMO Communication Systems with Imperfect Channel Knowledge." 2006 IEEE International Symposium on Signal Processing and Information Technology, Aug. 2006, pp. 745-748.
Patel, C. S. et al. "Analysis of OFDM/MC-CDMA under Imperfect Channel Estimation and Jamming." 2004 IEEE Wireless Communications and Networking Conference, Mar. 21-25, 2004, Atlanta, Georgia, US, pp. 954-958.
Sgraja, C. et al. "Decision Feedback Equalization for MC-CDM with Channel Uncertainty." IEEE International Conference on Communications, Jun. 20-24, 2004, Paris, France, pp. 2636-2641.
Slock, D. T. M. "Signal Processing Challenges for Wireless Communications." IEEE First International Symposium on Control, Communications and Signal Processing, Mar. 21-24, 2004, Hammamet, Tunisia, pp. 881-892.
Zhiwei, L. et al. "Tap Selection Based MMSE Equalization for High Data Rate UWB Communication Systems." 2005 IEEE International Symposium on Circuits and Systems, May 23-26, 2005, Kobe, Japan, pp. 5421-5424.

* cited by examiner

*Primary Examiner* — David Lugo
(74) *Attorney, Agent, or Firm* — Coats & Bennett, P.L.L.C.

(57) ABSTRACT

A method of equalizing a received signal compensates for frequency selectivity of the communication channel taking into account channel estimation errors. The method comprises generating channel estimates for the received signal, computing filter weights for an equalizer based on said channel estimates and a covariance of the channel estimation error, and filtering the received signal using the computed filter weights.

14 Claims, 2 Drawing Sheets

US 8,009,727 B2

EQUALIZER FOR SINGLE CARRIER FDMA RECEIVER

BACKGROUND

The present invention relates generally to equalization of received signals in a mobile communication system and, more particularly, to an equalizer for a receiver in a single carrier frequency division multiple access (SC-FDMA) system.

Orthogonal Frequency-Division Multiple Access (OFDMA) is an attractive technique for sharing an available radio resource with multiple users in a high-speed wireless data communication system. Since each subcarrier of an OFDMA signal is simply scaled by a complex-valued scalar after passing through a time dispersive channel, demodulation can be performed for each subcarrier individually, and hence equalization is not needed in the receiver. Moreover, through the use of a cyclic prefix, orthogonality among different subcarriers is preserved even if they are not completely synchronized so long as the relative time delay is limited. This property is particularly desirable for uplink communications because users assigned to different subcarriers are typically only coarsely time aligned.

A major drawback of OFDMA is the high peak-to-average-power ratio (PAR), or equivalently, the high crest factor (CF) (square root of PAR) of the transmitted waveform, which can cause undesired out-of-band radiation and/or inefficient power amplification in mobile terminals. Because of this limitation, Single-Carrier Frequency Division Multiple Access (SC-FDMA), whose transmitted waveforms have considerably lower peak-to-average-power ratio (PAR) than those of OFDMA, has recently been selected by 3GPP as the standard access method for the uplink (UL) in Evolved UTRA. The low PAR property of SC-FDMA signals enables the mobile terminals to transmit at higher efficiency while reducing undesired out-of-band emissions.

In an SC-FDMA system, there are two different methods of allocating subcarriers to different users, referred to as the localized or the distributed allocations. The former method allocates contiguous subcarriers to each individual user. This method requires less pilot overhead for channel estimation but provides limited frequency diversity for each user. The second method allocates subcarriers that are evenly distributed over the spectrum assigned to each user. It provides more frequency diversity but generally requires more pilot overhead for channel estimation. Both carrier allocation methods result in transmitted signals that have significantly lower PAR than conventional OFDMA signals.

Unlike conventional OFDMA systems, where the modulated symbols transmitted over different frequency tones can be demodulated independently of other symbols at the receiver, SC-FDMA requires an equalizer at the receiver to compensate for the frequency selectivity of the channel in order to demodulate the transmitted symbols. Although it is well known that a time-domain maximum likelihood sequence estimation (MLSE) equalizer is optimal in this situation, the complexity of such an equalizer will be exorbitant for the high transmission rates expected in E-UTRA. Consequently, a reduced-complexity, suboptimal frequency-domain equalizer is needed for SC-FDMA.

SUMMARY

A method of equalizing a received signal compensates for frequency selectivity of the communication channel while taking into account channel estimation errors. The method comprises generating channel estimates for the received signal, computing filter weights for an equalizer based on said channel estimates and a covariance of the channel estimation error, and filtering the received signal using the computed filter weights.

In one exemplary embodiment, the equalizer may comprise a single stage equalization filter that uses error-compensated filter weights to filter the received signal. In another embodiment, the equalizer may comprise a prefilter stage and an equalization stage. The received signal is first filtered in the prefilter to compensate for channel estimation errors and subsequently filtered in the equalization stage to compensate for the frequency selectivity of the channel.

DETAILED DESCRIPTION

Figure 1:
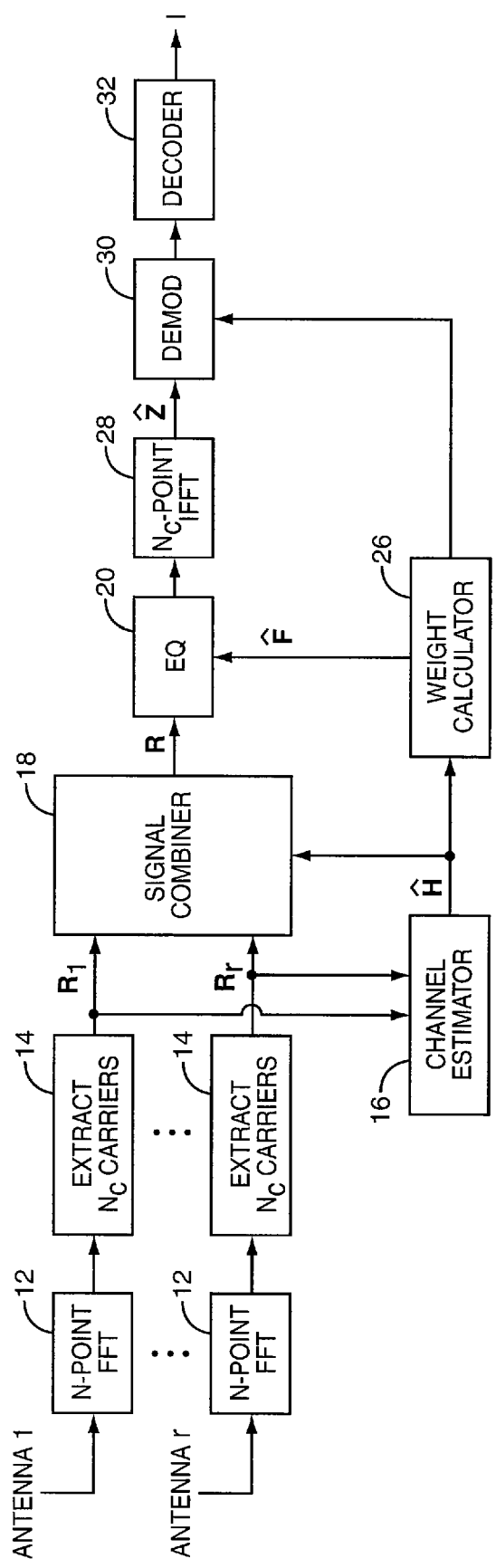
FIG. 1 illustrates a receiver for a single carrier FDMA system according to one exemplary embodiment of the present invention.

Referring now to the drawings, FIG. 1 illustrates the main functional elements of an SC-FDMA receiver 10 according to one exemplary embodiment. The sampled signals from two or more antennas (not shown) are first converted into the frequency domain by a time-to-frequency converter 12. The time-to-frequency converter 12 converts the samples into the frequency domain using an N-point Fast Fourier Transform (FFT). After conversion into the frequency domain, a subcarrier mapping function 14 extracts the received signal on the subcarriers of interest from the FFT output, where $N_C$ is the number of subcarriers. The received signal $R_i$ for the $i^{th}$ antenna may be represented by the signal vector $R_i = (R_i[1], R_i[2], \ldots, R_i[N_c])^T$, for $i = 1, 2, \ldots, r$. A typical baseband model of the received signal vector $R_i$ for the $i^{th}$ antenna is given by:

$$R_i = D(H_i)S + V_i, \quad (1)$$

where $H_i = (H_i[1], H_i[2], \ldots, H_i[N_c])^T$ denotes a vector of channel coefficients over the desired frequency sub-carriers for the $i^{th}$ antenna, $D(H_i)$ denotes a diagonal matrix with elements of $H_i$ as the diagonal elements, $S = [S[1], S[2], \ldots, S[N_c]]^T$ represents the $N_c$-point FFT of the time-domain, modulated symbols $Z = [Z[1], Z[2], \ldots, Z[N_c]]^T$ such that $ESS^H = I$, and $V_i = (V_i[1], V_i[2], \ldots, V_i[N_c])^T$ denotes the noise vector at the $i^{th}$ antenna, which is assumed to be a zero-mean, Gaussian-distributed random vector. The noise vector components are assumed to be uncorrelated across different sub-carriers, i.e., $EV_i[k]V_j^*[m] = 0$ if $k \neq m$ for any $i$ and $j$.

A channel estimator 16 processes the received signals $R_i$ to generate estimates $\hat{H}_i$ of the channel coefficients and provides the channel estimates $\hat{H}_i$ to a signal combiner 18. The signal combiner 18 combines the received signals $R_i$ from each antenna i using the channel estimates to produce a combined signal vector $R = (R[1], R[2], \ldots, R[N_c])^T$. The signal combiner 18 may comprise, for example, a maximal ratio combiner (MRC) or Interference Rejection Combiner (IRC). In the case when the noise is uncorrelated across antennas and identically distributed across subcarriers, i.e., $E[V_i V_j^H] =$ $\sigma_i^2 I\delta(i-j)$, an MRC can be used. For an MRC, the signal combiner 18 combines the signal vectors $R_i$ from each antenna according to:

$$R = \sum_{i=1}^{r} \frac{D(G_i)R_i}{\sigma_i}, \quad (2)$$

where $G_i \equiv (G_i[1], G_i[2], \ldots, G_i[N_c])^T$ represent the combining weight for the $i^{th}$ antenna, and $D(G_i)$ comprises a diagonal matrix with the elements of $G_i$ on its diagonal. The combining weights $G_i$ may be calculated according to:

$$G_i[k] = \frac{\hat{H}_i^*[k]}{\hat{H}[k]}, \quad (3)$$

where $\hat{H}[k] \equiv \sqrt{\sum_{i=1}^{r} |\hat{H}_i[k]|^2}$.

In the case when the noise vectors at different antennas are correlated (i.e., the noise is spatially colored), the MRC may be replaced by an IRC in order to achieve the optimal performance, which is well-known to those skilled in the art. For example, with the IRC the signal combiner 18 combines the signal vectors $R_i$ from each antenna according to:

$$R = (I_{N_c} \otimes 1_r^T) D(\overline{G}) \Lambda_{\overline{V}}^{-1} \overline{R}. \quad (4)$$

In Equation (4):

$\overline{R} = \text{vec}([R_1, R_2, \ldots R_r]^T);$ $\Lambda_{\overline{V}} = E[\overline{V}\overline{V}^H]$ where $\overline{V} = \text{vec}([V_1, V_2, \ldots, V_r]^T);$ $\overline{G} = ([G_1[1], G_2[1], \ldots, G_r[1], G_1[2], G_2[2], \ldots, G_r[2], \ldots, G_1[N_c], G_2[N_c], \ldots, G_r[N_c]]^T)$ where $$G_i[k] = \frac{\hat{H}_i^*[k]}{\hat{H}[k]}$$

and $\hat{H}[k]$ is the square root of the $k^{th}$ diagonal element of the matrix $(I_{N_c} \otimes 1_r^T) D(\overline{H})^H \Lambda_{\overline{V}}^{-1} D(\overline{H}) (I_{N_c} \otimes 1_r)$ and $\overline{H} = \text{vec}([H_1, H_2, \ldots, H_r]^T);$ $1_r \equiv (1, 1, \ldots, 1)^T$ denotes an all-one column vector of length r;

$I_{N_c}$ denotes an $N_c \times N_c$ identity matrix;

vec($\cdot$) denotes the vectorization operation of stacking the columns of the argument; and $\otimes$ denotes the Kronecker product.

The combined signal vector R can then be modeled as:

$$R = D(\hat{H})S + V, \quad (5)$$

where $\hat{H} = (\hat{H}[1], \hat{H}[2], \ldots, \hat{H}[N_c])^T$ denotes a vector of equivalent channel coefficients over the desired frequency sub-carriers after combining, $D(\hat{H})$ denotes a diagonal matrix with elements $\hat{H}$ of as the diagonal elements, and $V = (V[1], V[2], \ldots, V[N_c])^T$ denotes a zero-mean Gaussian noise vector with covariance matrix $E[VV^H] = I$.

The combined signal vector R is input to a frequency domain equalizer 20, which compensates the received signal vector R for the frequency selectivity of the uplink channel. A weight calculator 26 receives the channel estimates $\hat{H}_i$ for each antenna from the channel estimator 16 and computes filter weights $\hat{F}$ for the equalizer 20. The filter weight calculation is performed in a manner that takes into account channel estimation errors. While it is not possible to compute directly the channel estimation error, the covariance of the channel estimation error can be computed and used to refine the filter weight calculation. A frequency-to-time converter 28 converts the equalized signal back into the time domain. The output of the frequency-to-time converter 28 is an estimate $\hat{Z}$ of the QAM modulated symbols Z. A demodulator 30 and decoder 32 follow the frequency to time converter 28 for demodulating and decoding $\hat{Z}$ to obtain an estimate of an original information signal I that was transmitted In a conventional receiver, filter weights $\hat{F}_{CONV}$ for the equalizer can be computed according to:

$$\hat{F}_{conv} = D(\hat{H})^H (D(\hat{H})D(\hat{H})^H + I)^{-1} = D(f), \quad (6)$$

where $f = (f[1], f[2], \ldots, f[N_c])^T$ and $$f[k] = \frac{\hat{H}[k]^*}{|\hat{H}[k]|^2 + 1}. \quad (7)$$

The conventional way of computing the equalizer weights, as described in Equation (6), does not take into the account the channel estimation error. The resulting filter weights $\hat{F}_{CONV}$ therefore do not minimize the mean squared error between the transmitted symbols and equalizer output when there are channel estimation errors.

According to one embodiment of the present invention, channel estimation errors are taken into account to compute the filter weights $\hat{F}$ for an error-compensated MMSE equalizer. If $e = [e[1], e[2], \ldots, e[N_c]]^T$ denotes the channel estimation error such that $H = \hat{H} + e$. The covariance of the channel estimation error e can then be given by:

$$\Lambda_e = Eee^H. \quad (8)$$

The filter weight $\hat{F}$ can then be modeled by:

$$\begin{aligned}
\hat{F} &= \underset{F}{\operatorname{argmin}} \|S - FR\|^2 \quad (9) \\
&= (ESR^H)(ERR^H)^{-1} \\
&= (ES[D(\hat{H}+e)S+V])(E[D(\hat{H}+e)S+V] \\
&\quad [D(\hat{H}+e)S+V]^H)^{-1} \\
&= D(\hat{H})^H (D(\hat{H})D(\hat{H})^H + E[eSS^H e^H] + I)^{-1} \\
&= D(\hat{H})^H (D(\hat{H})D(\hat{H})^H + E_e\{eE[SS^H|e]e^H\} + I)^{-1} \\
&= D(\hat{H})^H (D(\hat{H})D(\hat{H})^H + E_e\{eE[SS^H]e^H\} + I)^{-1} \\
&= D(\hat{H})^H (D(\hat{H})D(\hat{H})^H + I + \Lambda_e)^{-1},
\end{aligned}$$

where it is assumed that the transmitted symbols S are independent of the channel estimation error e. The estimation error covariance matrix $\Lambda_e$ can often be pre-computed according to the channel estimation method. For example, for maximum-likelihood channel estimator, it can be shown that:

$$\Lambda_e = E(\hat{H} - H)(\hat{H} - H)^H \quad (10)$$

-continued $$= W_N(J, I)(W_N(J, I)^H D(P)^H D(P) W_N(J, I))^{-1}$$
$$W_N(J, I)^H,$$

where $P=[P[1], P[2], \ldots, P[N_c]]^T$ denotes the vector of pilot symbols over which the channel is estimated, J denotes the index set containing indices of the $N_c$ desired sub-carriers, I denotes the index set containing the indices of the estimated channel tap locations, and $W_N(J,I)$ denotes a sub-matrix of the N-point FFT matrix $W_N$ formed by the rows indexed by the set J and the columns indexed by the set I. When the pilot symbols have a constant magnitude in frequency domain, as it is the case when the pilot symbols are properly designed, Equation (10) reduces to:

$$\Lambda_e = W_N(J,I)(W_N(J,I)^H W_N(J,I))^{-1} W_N(J,I)^H. \quad (11)$$

Furthermore, in the case of distributed sub-carrier allocation where the indices in the set J are uniformly distributed over the N possible indices, Equation (11) reduces further to $$\Lambda_e = W_N(J,I) W_N(J,I)^H. \quad (12)$$

Figure 2:
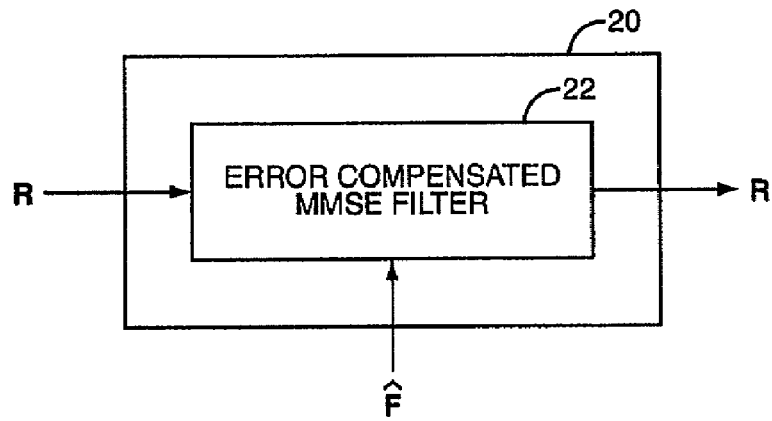
FIG. 2 illustrates a first embodiment of an equalizer for the receiver shown in FIG. 1.

The filter weights $\hat{F}$ can be computed according to Equation (9) using one of Equations (10), (11), and (12) to compute the covariance $\Lambda_e$ of the channel estimation error. In this case, the equalizer 20 may comprise a single MMSE equalization filter 22 where the filter coefficients are given by the filter weights $\hat{F}$ as shown in FIG. 2.

It may be noted that Equation (9) can be rewritten as follows:

$$\hat{F} = D(\hat{H})^H (D(\hat{H}) D(\hat{H})^H + I)^{-1} (D(\hat{H}) D(\hat{H})^H + I) (D(\hat{H}) D$$
$$(\hat{H})^H + I + \Lambda_e)^{-1}. \quad (13)$$

Note that the first term $D(\hat{H})^H (D(\hat{H}) D(\hat{H})^H + I)^{-1}$ in Equation (13) is the same as Equation (6). Therefore, Equation (13) can be reduced to:

$$\hat{F} = \hat{F}_{conv} \hat{P}, \quad (14)$$

where $$\hat{P} \equiv (D(\hat{H}) D(\hat{H})^H + I)(D(\hat{H}) D(\hat{H})^H + I + \Lambda_e)^{-1} \quad (15)$$

Figure 3:
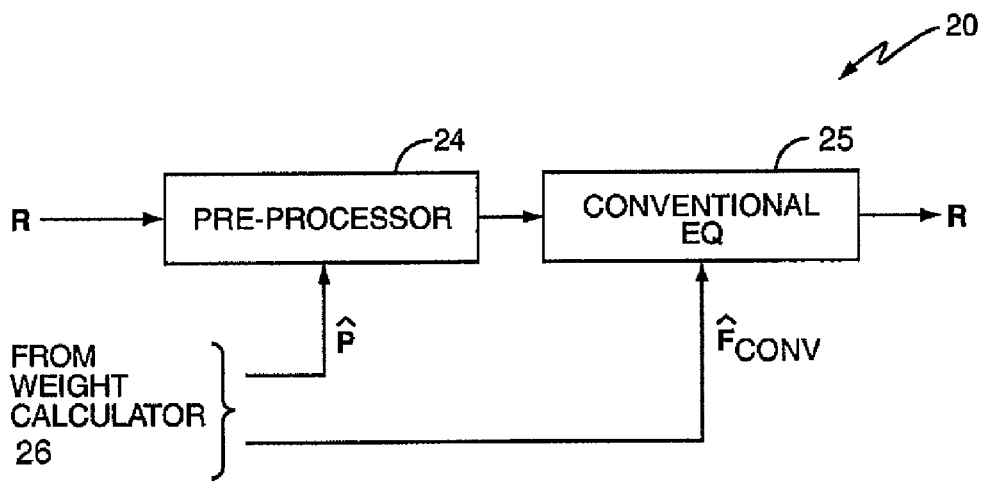
FIG. 3 illustrates a second embodiment of an equalizer for the receiver shown in FIG. 1.

Equation (15) can also be rewritten as follows:

$$\hat{P} = \left(D(\hat{H}) D(\hat{H})^H + I + \Lambda_e - \Lambda_e\right) \left(D(\hat{H}) D(\hat{H})^H + I + \Lambda_e\right)^{-1} \quad (16)$$
$$= I - \Lambda_e \left(D(\hat{H}) D(\hat{H})^H + I + \Lambda_e\right)^{-1}$$
$$= I - B,$$

where $B \equiv \Lambda_e (D(\hat{H}) D(\hat{H})^H + I + \Lambda)^{-1}$. It follows from Equation (16) that an error-compensated MMSE equalizer can be implemented as a pre-filter 24 followed by the conventional MMSE equalizer filter 25, as shown in FIG. 3. The filter weights $\hat{P}$ for the pre-filter 24 are a function of the estimated channel $\hat{H}$ and the error covariance matrix $\Lambda_e$. The filter weights $\hat{F}_{conv}$ for the conventional MMSE equalizer are a function of the channel estimates $\hat{H}$.

Figure 4:
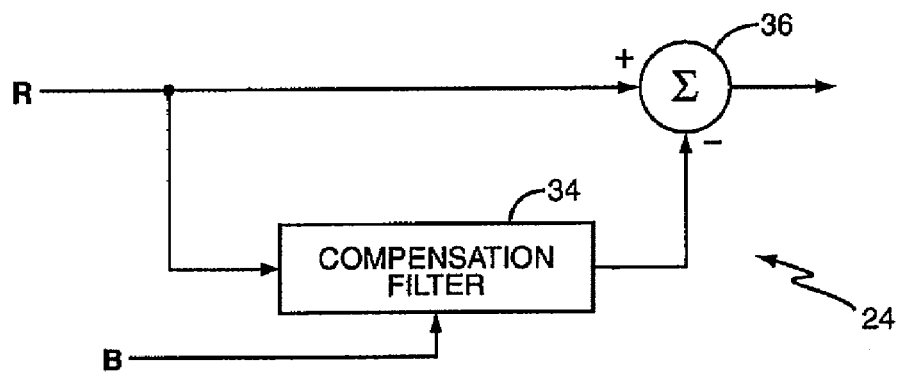
FIG. 4 illustrates an exemplary prefilter for the equalizer embodiment shown in FIG. 3.

FIG. 4 illustrates one exemplary embodiment of the pre-filter 24. In this embodiment, the received signal is passed through a compensation filter 34 whose coefficients are given by B to obtain an estimate of the signal contribution due to the channel estimate error. Subtractor 36 subtracts the output of the compensation filter 28 from the received signal R before passing through the conventional MMSE equalizer 22.

Those skilled in the art will appreciate that the inventive receiver 10 can be implemented with a digital signal processor by executing code stored in a memory. The received signals on each antenna may be downconverted to baseband, sampled, and digitized for input to the receiver 10.

What is claimed is:

1. A method of equalizing a received signal, said method comprising:
generating channel estimates for the received signal;
computing equalization filter weights based on said channel estimates;
computing prefilter weights based on said channel estimates and a covariance of a channel estimation error; and
filtering the received signal using the computed equalization filter weights and prefilter weights.

2. The method of claim 1 wherein filtering the received signal comprises filtering the received signal in successive filter stages using said prefilter weights and said equalization filter weights.

3. The method of claim 2 comprising filtering the received signal in a prefilter stage to estimate the contribution attributable to the channel estimation error to the received signal, and subtracting the contribution of said channel estimation error to obtain an error compensated signal.

4. The method of claim 3 comprising filtering the error compensated signal in an equalization stage to compensate for frequency selectivity of the channel.

5. The method of claim 1 further comprising combining signals received on two or more antennas to obtain said received signal.

6. The method of claim 5 wherein combining signals received on two or more antennas comprises combining said received signals using maximal ratio combining.

7. The method of claim 5 wherein combining signals received on two or more antennas comprises combining said received signals using interference rejection combining.

8. A receiver including an equalizer to equalize a received signal, said receiver comprising:
a channel estimator to generate channel estimates for the received signal;
an equalizer to filter the received signal; said equalizer including a prefilter to filter the received signal to obtain an error compensated signal, and an equalization filter to filter the error compensated signal to compensate for frequency selectivity of the channel; and
a weight calculator to calculate filter weights for said prefilter based on said channel estimates and said covariance of a channel estimation error, and to calculate filter weights for the equalization filter based on id channel estimates.

9. The receiver of claim 1 wherein the equalization filter comprises an MMSE filter.

10. The receiver of claim 8 wherein the pre-filter includes a compensation filter to filter the received sign estimate the contribution attributable to the channel estimation error to the received signal, and a subtractor to subtract the estimated contribution of the channel estimation error from the received signal to obtain the error compensated signal.

11. The receiver of claim 10 wherein the equalization filter comprises an MMSE filter to filter the error compensated signal.

12. The receiver of claim 8 further comprising a combiner to combine signals received on two or more antennas to obtain said received signal.

13. The method of claim 12 wherein the combiner comprises a maximal ratio combiner.

14. The method of claim 12 wherein the combiner comprises an interference rejection combiner.

* * * * *

UNITED STATES PATENT AND TRADEMARK OFFICE
CERTIFICATE OF CORRECTION

| | |
|---|---|
| PATENT NO. | : 8,009,727 B2 |
| APPLICATION NO. | : 11/676638 |
| DATED | : August 30, 2011 |
| INVENTOR(S) | : Hui et al. |

It is certified that error appears in the above-identified patent and that said Letters Patent is hereby corrected as shown below:

In Column 3, Line 33, delete " $\overline{\mathbf{R}} = vec\left(\left[\mathbf{R}_1, \mathbf{R}_2, \cdots \mathbf{R}_t\right]^T\right);$ " and insert -- $\overline{\mathbf{R}} = vec\left(\left[\mathbf{R}_1, \mathbf{R}_2, \cdots, \mathbf{R}_t\right]^T\right);$ --, therefor.

In Column 5, Line 47, delete " $+ \mathbf{I} + \Lambda\Big)^{-1}.$ " and insert -- $+ \mathbf{I} + \Lambda_e\Big)^{-1}.$ --, therefor.

In Column 6, Line 45, in Claim 8, delete "id" and insert -- said --, therefor.

In Column 6, Line 47, in Claim 9, delete "claim 1" and insert -- claim 8 --, therefor.

In Column 6, Line 50, in Claim 10, delete "sign" and insert -- signal to --, therefor.

Signed and Sealed this
Seventeenth Day of April, 2012

David J. Kappos
*Director of the United States Patent and Trademark Office*